United States Patent [19]
Hawkins et al.

[11] Patent Number: 5,511,457
[45] Date of Patent: Apr. 30, 1996

[54] STEERING CONTROL SYSTEM FOR AN AUTONOMOUS MACHINE

[75] Inventors: Mark R. Hawkins, Chillicothe; Joel L. Peterson, East Peoria, both of Ill.; Kenneth E. Poppe, Dubuque, Iowa

[73] Assignee: Caterpillar Inc., Peoria, Ill.

[21] Appl. No.: 334,724

[22] Filed: Nov. 4, 1994

[51] Int. Cl.⁶ .............................. F01B 25/02; F15B 11/00
[52] U.S. Cl. ................................... 91/6; 91/427; 91/527; 60/384
[58] Field of Search .................... 91/6, 32, 367, 91/427, 527; 60/384, 385, 387, 400

[56] References Cited

U.S. PATENT DOCUMENTS

| | | | |
|---|---|---|---|
| 2,939,653 | 6/1960 | Rasmussen et al. | 91/367 X |
| 3,606,957 | 9/1971 | Fuzzell . | |
| 3,631,762 | 1/1972 | Fuzzell | 91/427 X |
| 3,768,367 | 10/1973 | Fuzzell | 91/367 X |
| 3,892,079 | 7/1975 | Hirano et al. | 91/527 X |
| 3,933,081 | 1/1976 | Taki et al. | 91/527 X |
| 4,750,628 | 6/1988 | Laurich-Trost | 180/140 X |
| 5,014,596 | 5/1991 | St. Martin | 91/427 X |
| 5,262,774 | 11/1993 | Kuwahara et al. . | |

*Primary Examiner*—John E. Ryznic
*Attorney, Agent, or Firm*—John W. Grant

[57] ABSTRACT

A steering control system for an autonomous machine has a manual steering control valve for directing fluid from a pump to either a head end chamber or a rod end chamber of a hydraulic steering actuator. In one embodiment, an electrically actuated steering valve device is disposed in series flow relationship between the pump and the manual steering control valve and is operative to direct fluid from the pump to the head end and rod end chambers. In another embodiment, a electrically actuated device mechanically actuates the manual steering control valve for steering the machine.

12 Claims, 3 Drawing Sheets

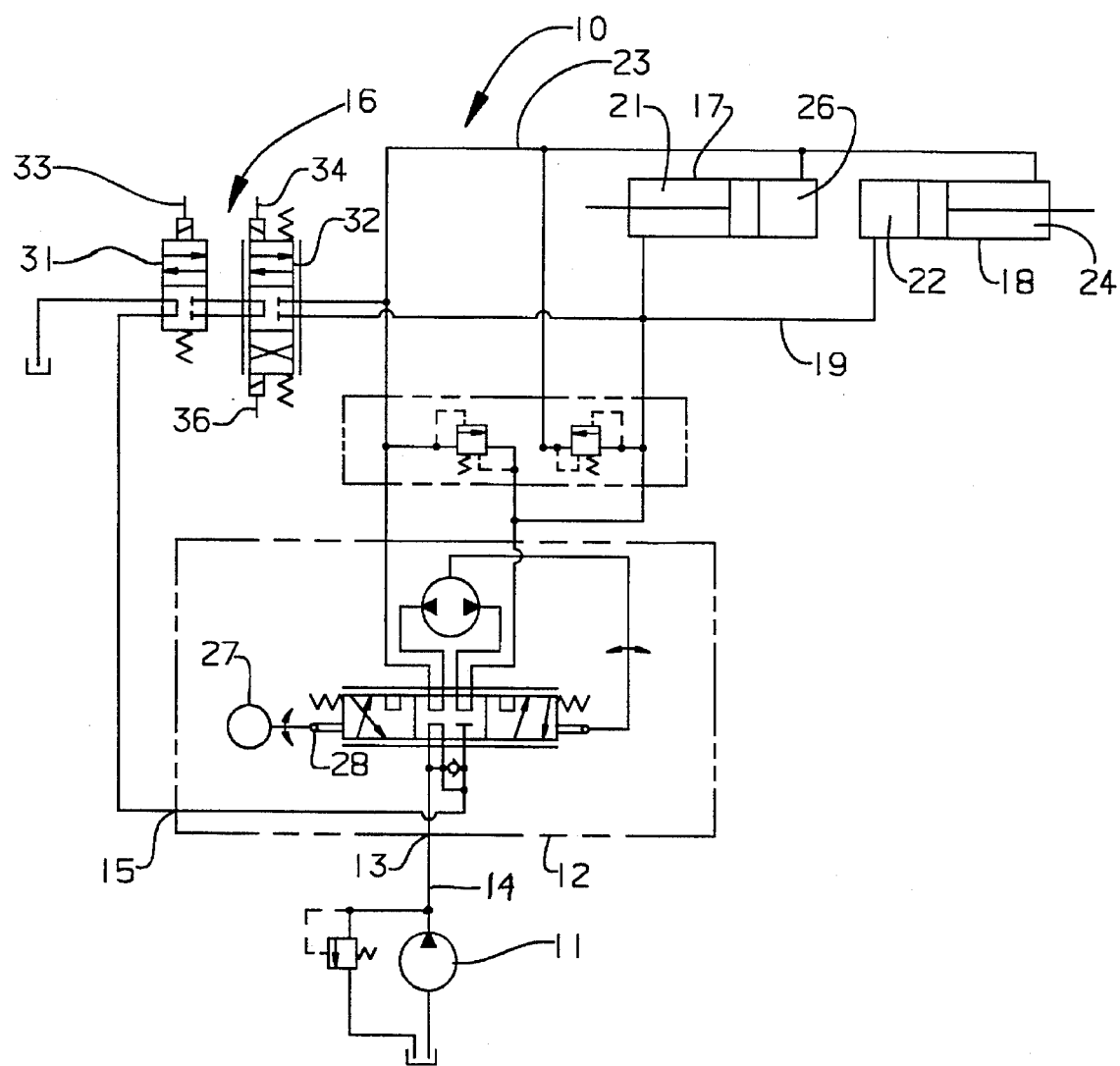

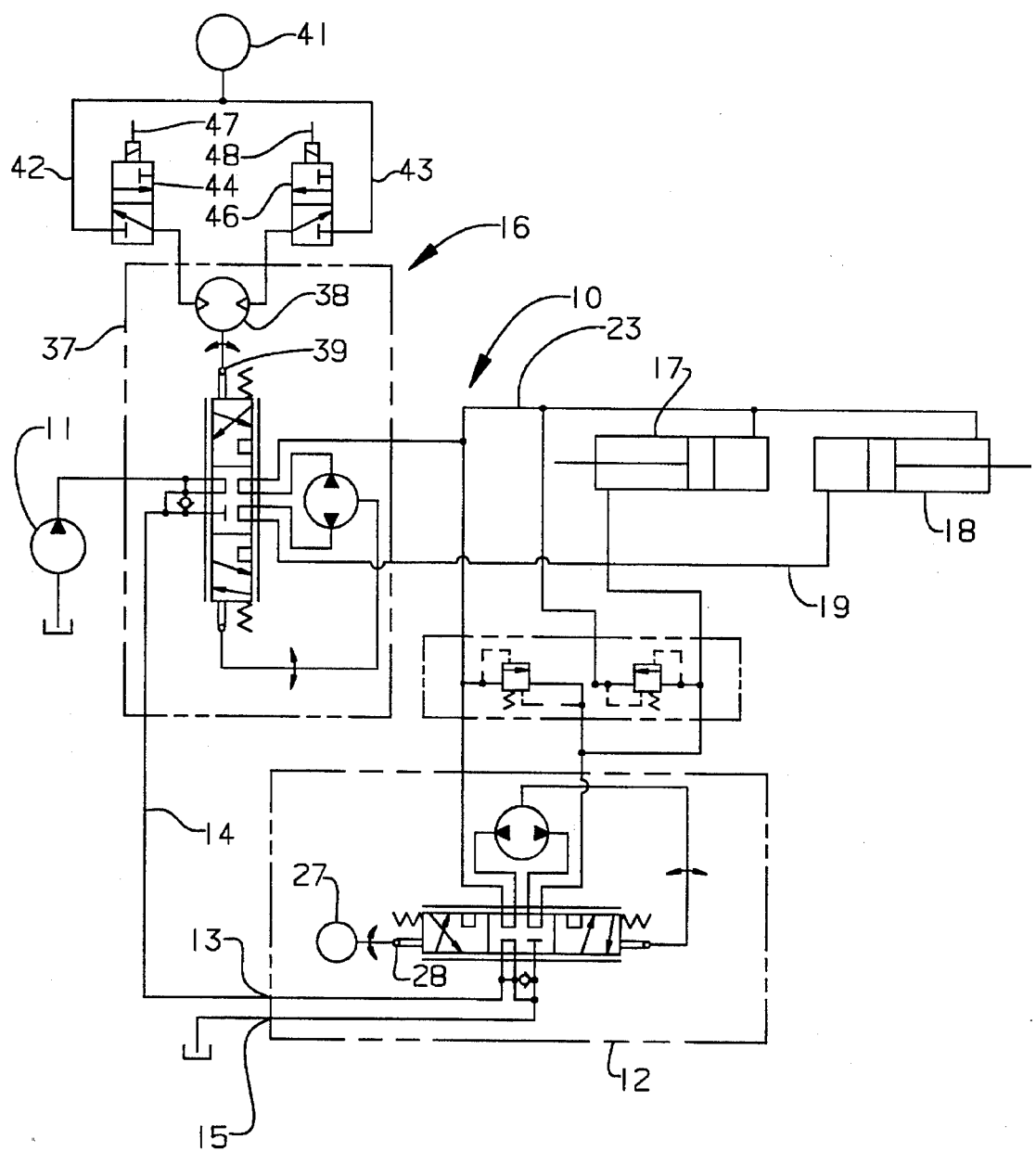
Fig_2_

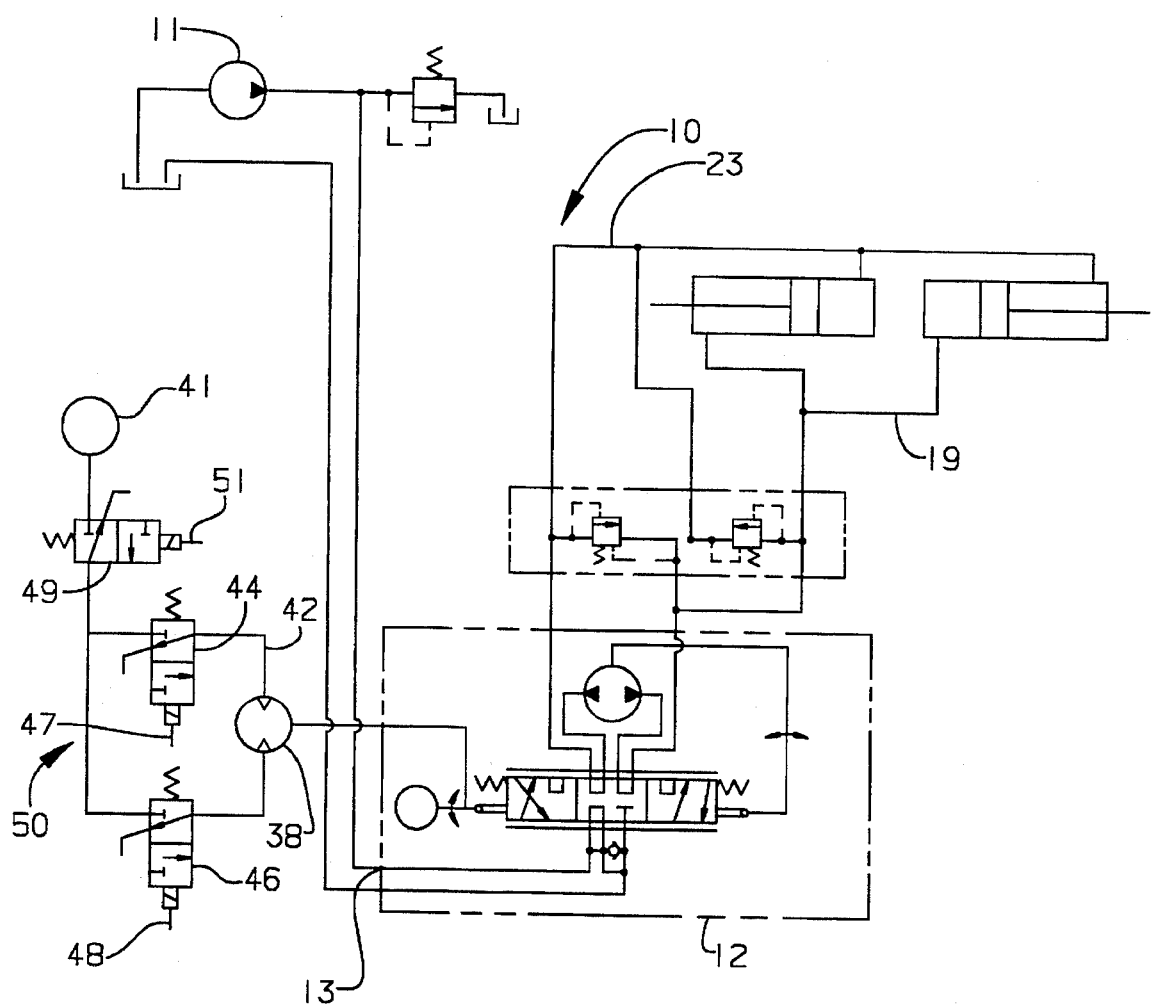
Fig_3_

5,511,457

STEERING CONTROL SYSTEM FOR AN AUTONOMOUS MACHINE

TECHNICAL FIELD

This invention relates to a steering control system and more particularly to a steering control system having both manual in cab steering capabilities and remote electronic steering capabilities.

BACKGROUND ART

There has been considerable interest in automating earthmoving machinery to the point of providing unmanned autonomous operation of the machine through electronic signals beamed from a remote location such as a satellite. Such autonomous machines include additional devices that perform many of the physical operations that an onboard operator would perform such as steering the machine. However, one requirement imposed on the addition of electrical controls is that the normal manually manipulatable controls should not be compromised so that the machine can still be manually driven by an onboard operator. For example, it is more practical to manually maneuver the machine in tight quarters such as when the machine is taken to a service facility for maintenance or service. Moreover, some autonomous machines use signals from a satellite and those signals would be blocked if the machine is driven into a building thereby necessitating manual operation of the machine.

Thus, it would be desirable to have a control system for an autonomous machine which provides for manned onboard operation of the machine through the normal vehicular controls and unmanned operation through electronically actuated controls added to the machine.

DISCLOSURE OF THE INVENTION

In one aspect of the present invention, a steering control system for steering an autonomous machine has a hydraulic pump and at least one hydraulic steering actuator having a pair of actuating chambers. A manual steering control valve communicates with the pump and is connected to the actuating chambers. An electrically actuated auxiliary steering device is operatively associated with the manual steering control valve.

In another aspect of the present invention, a steering control system for an autonomous machine has a hydraulic pump and at least one hydraulic steering actuator having a pair of actuating chambers. A manual steering control valve communicates with the pump and is connected to the actuating chambers. An electrically actuated valve device communicates with the pump and is connected to the actuating chambers in parallel with the manual steering control valve.

BRIEF DESCRIPTION OF THE DRAWINGS

FIG. 1 is a schematic illustration of a steering control system of the present invention.

FIGS. 2 and 3 are schematic illustrations of alternate embodiments of the present invention.

BEST MODE FOR CARRYING OUT THE INVENTION

Referring to FIG. 1, a steering control system 10 includes a pump 11, a manual steering control valve such as a conventional hand metering unit 12 having an input port 13 connected to the pump through a supply conduit 14, an electrically controlled open center steering valve device 16 connected to an outlet port 15 of the hand metering unit 12, and a pair of hydraulic steering actuators in the form of double acting hydraulic motors 17, 18. A first actuator conduit 19 connects the hand metering unit to a rod end chamber 21 of the hydraulic motor 17 and a head end chamber 22 of the hydraulic motor 18. Similarly, another actuator conduit 23 connects the hand metering unit to a rod end chamber 24 of the hydraulic motor 18 and a head end chamber 26 of the hydraulic motor 17. A steering wheel 27 is connected to the hand metering unit through a rotatable input shaft 28 for manually manipulating the hand metering unit in the usual manner. In this embodiment, the hand metering unit 12 has priority over the steering valve device 16.

The steering valve device 16 includes a two-position, solenoid actuated abort valve 31 and an electro-hydraulic proportional valve 32. The abort valve 31 is connected to the outlet port 15 of the steering control valve 12 to provide a series flow relationship from the pump to, the abort valve through the hand metering unit. The abort valve is moved downwardly to an energized position in response to receiving an electrical signal through a lead line 33. The proportional valve 32 is connected in series with the abort valve 31 and is connected to the actuator conduits 19, 23 in parallel With the hand metering unit 12. The proportional valve is spring biased to the neutral position shown and is moved to first and second operative positions in response to electrical signals directed thereto through lead lines 34, 36.

A first alternate embodiment of a steering control system 10 of the present invention is disclosed in FIG. 2. It is noted that the same reference numerals of the first embodiment are used to designate similarly constructed counterpart elements of this embodiment. In this embodiment, however, the steering valve device 16 includes an open center mechanically actuated hand metering unit 37 disposed within the supply conduit 14 between the pump and the hand metering unit 12 and connected to the actuator conduits 19,23 in parallel to the hand metering unit 12. A rotary air motor 38 is mechanically connected to the hand metering unit 37 through a rotatable shaft 39 and to a source of pressurized air 41 through a pair of air lines 42,43. A pair of electrically actuated air valves 44,46 are disposed within the air lines 42,43 respectively. The air valves are spring biased to the position shown and are moved to an actuated position by electrical signals through lead lines 47,48.

Another embodiment is disclosed in FIG. 3. In this embodiment, a device 50 is provided for mechanically actuating the steering control valve in response to receiving an electrical signal. The device 50 includes having the air motor 38 connected directly to the rotatable shaft 28 connecting the steering wheel to the hand metering unit 12. Additionally, a solenoid actuated abort valve 49 is disposed between the source of pressurized air 41 and the air valves 44,46.

INDUSTRIAL APPLICABILITY

In the use of the FIG. 1 embodiment, fluid from the pump passes through the hand metering unit 12 and the abort valve 31 when the valves are in the position shown. Manual steering in a first direction is achieved by manually rotating the steering wheel 27 in a first direction to direct pressurized fluid from the pump through the actuator conduit 19 to simultaneously extend the hydraulic motor 18 and retract the hydraulic motor 17. Manual steering in the opposite direction is achieved by manually rotating the steering wheel in the opposite direction to direct pressurized fluid through the actuator conduit 23 to simultaneously retract the hydraulic motor 18 and extend the hydraulic motor 17.

Remote unmanned steering is initiated by preconditioning the system by directing an electrical signal through the lead line 33 to move the abort valve 31 downwardly to its energized position directing the pump flow to the proportional valve 32 with the hand metering unit in the neutral position shown, the pump flow passes through the open center port of the hand metering unit to the proportional valve. Steering in the first direction is achieved by directing an electrical signal through the lead line 36 for moving the proportional valve 32 upwardly to a position directing pressurized fluid from the pump through the actuator conduit 19 to simultaneously extend the hydraulic motor 18 and retract the hydraulic motor 17. Similarly, steering in the opposite direction is achieved by directing an electrical signal through the lead line 34 for moving the proportional valve 32 downwardly directing pressurized fluid through the actuator line 23 to simultaneously retract the hydraulic motor 18 and extend the hydraulic motor 17.

In this embodiment, the electrical signal to the abort valve 33 can preferably be manually blocked by an operator for moving the abort valve to the position shown for manual operation.

Alternatively, the abort valve 31 may be deleted such that the pump flow would always pass directly to the proportional valve 32. Manual steering of such a system would be achieved by manually blocking the electrical signals through both of the lead lines 34,36.

In the FIG. 2 embodiment, manual steering is initiated by deenergizing the solenoid valves 47,48 thereby causing the hand metering unit 37 to be spring biased to the position shown. With the hand metering unit 37 at the position shown, fluid from the pump 11 passes through the open center porting of the hand metering unit 37 to the hand metering unit 12. Manual steering is, thus, accomplished as described above.

Remote unmanned steering of the FIG. 2 embodiment in the first direction is achieved by directing an electrical signal through the lead line 47 directing pressurized air from the source 41 to the air motor 38 which, in turn, rotates the shaft 39 for actuating the hand metering unit 37 in a first direction for directing pressurized fluid from the pump through the actuator conduit 19. Similarly, remote unmanned steering in the opposite direction is achieved by directing an electrical signal through the lead line 48 to energize the valve 46 to direct air from the source 41 to the air motor 38 which rotates the shaft 39 in the opposite direction for directing the pump flow through the actuator conduit 23. The remote unmanned steering can be overridden by manually blocking the electronic signals through the lead lines 47,48 by appropriate electrical switching devices. With the valves in the deenergized position shown, the air motor 38 is vented to atmosphere.

Manual steering of the embodiment of FIG. 3 is achieved by blocking the electrical signal through the lead line 51 so that the abort valve 49 is spring biased to the position shown. At this position, the pressurized air from the source 41 is blocked while the air valves 44 are vented. Under this condition, the steering wheel 37 can be readily rotated in either direction for steering the machine as described above.

Remote unmanned steering is initiated by preconditioning the system by directing an electrical signal through the lead line 51 actuating the solenoid valve 49 to its operative position communicating the source of air 41 to the air valves 44,46. Steering in the first direction is achieved by directing an electrical signal through the lead line 47 to energize the solenoid valve 44. This directs pressurized air to the air motor 38 thereby rotating the shaft 28 in the appropriate direction for directing pressurized fluid from the pump through the actuator conduit 19. Similarly, steering in the opposite direction is achieved by directing an electrical signal through the lead line 48 to energize the solenoid valve 46. This directs pressurized air to the air motor 38 for rotating the shaft 28 in the opposite direction resulting in pressurized fluid being directed through the conduit 23.

In view of the above, it is readily apparent that the structure of the present invention provides an improved steering control system which utilizes the basic steering control components for manual steering of the machine and an electrically actuated valve device operatively associated with the existing steering components for electronically steering the machine. The components of the electrically actuated valve device are incorporated within the steering control in a manner so that manual steering can be achieved substantially unimpeded by the addition of the electrically controlled valve device.

Other aspects, objects and advantages of this invention can be obtained from a study of the drawings, the disclosure and the appended claims.

We claim:

1. A steering control system for steering a machine including a hydraulic pump and at least one hydraulic steering actuator having a pair of actuating chambers comprising:

a hand metering unit connected to the actuating chambers and having a rotatable element and an input port in communication with the pump; and means for mechanically actuating the steering control valve in response to receiving an electrical signal, the actuating means including a rotary fluid motor drivingly connected to the rotatable element.

2. The steering control system of claim 1 wherein the actuating means includes a source of pressurized fluid and electrically actuated valve means connected between the source of pressurized fluid and the rotary fluid motor.

3. The steering control system of claim 2 wherein the valve means includes a pair of electrically actuated valves disposed between the source of pressurized fluid and the rotary fluid motor.

4. The steering control system of claim 3 including an abort valve disposed between the source of pressurized fluid and the electrically actuated valves.

5. The steering control system of claim 4 wherein the rotary fluid motor is an air motor.

6. A steering control system for steering a machine including a hydraulic pump and at least one hydraulic steering actuator having a pair of actuating chambers comprising:

a manual steering control valve communicating with the pump and connected to the pair of actuating chambers;

an electro-hydraulic proportional valve communicating with the pump and connected to the actuating chambers in parallel with the steering control valve to selectively direct fluid from the pump to the actuating chambers for steering; and a two-position solenoid actuated abort valve disposed between the proportional valve and the pump.

7. A steering control system for steering a machine including a hydraulic pump and at least one hydraulic steering actuator having a pair of actuating chambers comprising:

a manual steering control valve communicating with the pump and connected to the pair of actuating chambers; and an electrically controlled steering valve device communicating with the pump and connected to the actuating chambers in parallel with the steering control valve wherein the steering control valve and the steering valve device are open centered and connected in a series flow relationship.

8. The steering, control system of claim 7 wherein the steering control valve is disposed between the pump and the steering valve device.

9. The steering control system of claim 8 wherein the steering control valve has an outlet port and the steering valve device includes an electro-hydraulic proportional valve communicating with the outlet port.

10. A steering control system for steering a machine including a hydraulic pump and at least one hydraulic steering actuator having a pair of actuating chambers comprising:

a manual steering control valve communicating with the pump and connected to the pair of actuating chambers; and an electrically controlled steering valve device communicating with the pump and connected to the actuating chambers in parallel with the steering control valve and including an open center, mechanically actuated control valve connected to the pump and to the actuating chambers, and an air motor operatively connected to the mechanically actuated control valve.

11. The steering control system of claim 10 including a source of pressurized air and an electrically actuated valve device disposed between the source of pressurized air and opposite sides of the air motor.

12. The steering control system of claim 11 wherein the electrically actuated valve device includes a pair of solenoid actuated valves each having a first position venting the air motor to the atmosphere and a second position communicating pressurized air to the air motor.

* * * * *